(12) United States Patent
Matsuda et al.

(10) Patent No.: US 10,161,439 B2
(45) Date of Patent: Dec. 25, 2018

(54) CONNECTING ROD AND MANUFACTURING METHOD THEREOF

(71) Applicant: HONDA MOTOR CO., LTD., Tokyo (JP)

(72) Inventors: Hideki Matsuda, Wako (JP); Yasuyuki Iwasaki, Wako (JP); Hiroshi Hayashi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/564,034

(22) PCT Filed: Mar. 9, 2016

(86) PCT No.: PCT/JP2016/001306
§ 371 (c)(1),
(2) Date: Oct. 3, 2017

(87) PCT Pub. No.: WO2016/166932
PCT Pub. Date: Oct. 20, 2016

(65) Prior Publication Data
US 2018/0087562 A1     Mar. 29, 2018

(30) Foreign Application Priority Data

Apr. 16, 2015  (JP) .................................. 2015-083861

(51) Int. Cl.
*F16C 7/02*     (2006.01)
*B21D 37/16*   (2006.01)
(Continued)

(52) U.S. Cl.
CPC .............. *F16C 7/023* (2013.01); *B21D 37/16* (2013.01); *B21D 53/84* (2013.01); *F16C 9/045* (2013.01); *F16C 2360/22* (2013.01); *F16J 1/16* (2013.01)

(58) Field of Classification Search
CPC .... F16C 7/02; F16C 7/023; F16C 9/04; F16C 9/045; F16C 2360/22; F16J 1/14; F16J 1/06; B21D 37/16; B21D 53/84
(Continued)

(56) References Cited

U.S. PATENT DOCUMENTS 7,802,493 B2 * 9/2010 Kubota .................... F16C 7/023
                                                         74/579 R
8,152,939 B2 * 4/2012 Hasegawa ............... F16C 7/023
                                                         148/333
(Continued)

FOREIGN PATENT DOCUMENTS

EP        0056347 A2    7/1982
JP       52-124406 A   10/1977
(Continued)

OTHER PUBLICATIONS

Notice of Reasons of Rejection dated Mar. 13, 2018, issued in counterpart Japanese Application No. 2017-512189, with English translation. (6 pages).
(Continued)

*Primary Examiner* — David H Bollinger
(74) *Attorney, Agent, or Firm* — Westerman, Hattori, Daniels & Adrian, LLP

(57) ABSTRACT

Provided is a connecting rod which can be manufactured without increasing the cost, and is provided with an effectively strengthened rod portion. The rod portion includes a pair of ribs (21) extending in parallel to each other in cross sectional view, and a web (22) connected between substantially vertically middle parts of the ribs. Each rib includes a rib root portion (23) located in a vertically central part thereof in cross sectional view, and a pair of rib tip portions (24) located at both vertical ends thereof, and each rib tip portion has a higher hardness than the web by 40 HV or
(Continued)

more, and the rib root portion has a higher hardness than the web by 30 HV or more.

8 Claims, 5 Drawing Sheets

(51) Int. Cl.
    *B21D 53/84*     (2006.01)
    *F16C 9/04*     (2006.01)
    *F16J 1/16*     (2006.01)

(58) Field of Classification Search
    USPC .................................... 74/579 E; 123/90.61
    See application file for complete search history.

(56) References Cited

U.S. PATENT DOCUMENTS

| | | | |
|---|---|---|---|
| 8,479,704 B2 * | 7/2013 | Doi | C23C 8/10 |
| | | | 123/197.3 |
| 2004/0159180 A1 | 8/2004 | Ogawa et al. | |

FOREIGN PATENT DOCUMENTS

| | | |
|---|---|---|
| JP | 57-090921 U | 6/1982 |
| JP | 57-115937 U | 7/1982 |
| JP | 9-196044 A | 7/1997 |
| JP | 2004-308887 | 11/2004 |
| JP | 2005-14079 A | 1/2005 |
| JP | 2005-121056 A | 5/2005 |
| JP | 2007-146233 A | 6/2007 |
| JP | 2011-84767 A | 4/2011 |
| JP | 5268715 B2 | 8/2013 |

OTHER PUBLICATIONS

Notice of Reasons of Rejection dated May 8, 2018. issued in counterpart Japanese Application No. 2017-512189, with English translation. (6 pages).

International Search Report dated Jun. 7, 2016, issued in counterpart International Application No. PCT/JP2016/001306 (2 pages).

* cited by examiner ns of the present invention

CONNECTING ROD AND MANUFACTURING METHOD THEREOF

TECHNICAL FIELD

The present invention relates to a connecting rod connecting a piston with a crankshaft in an internal combustion engine, and in particular, to a connecting rod including a locally strengthened rod portion connecting a big end with a small end, and a manufacturing method thereof.

BACKGROUND ART

As a manufacturing method for effectively increasing the strength of the rod portion of a connecting rod, it is known to perform a hot forging step for hot forging the rod portion including a web consisting of a plate strip and two ribs projecting from either side edge of the web (so as to have an H-shaped cross section), a cold forging step using an open die assembly exposing both side edges of the web while enclosing the remaining part of the web and the ribs for cold forging the rod portion while allowing burr to protrude from either open side end of the open die assembly until the cross sectional area of the rod portion is reduced by 10 to 30%, and a step for removing the burr. (Patent Document 1)

It is also known to perform a cold forging of the rod portion without creating burr on the rod portion. The free ends of each rib are given with a relatively large thickness and are work hardened so that the moment of inertia of area of the rod portion may be increased, and the strength of the rod portion against buckling may be increased. See Patent Document 2. In this method, the die assembly includes an upper die assembly consisting of an upper rod die assembly, and a lower die assembly consisting of a lower rod die assembly. The die assembly further includes a pair of side die assemblies, a small end die assembly and a big end die assembly. Owing to a guiding action provided by a male tapered surface formed on the outer surfaces of the side die assemblies and the end die assemblies, and a female tapered surface formed on the upper rod die assembly, during the cold forging step, the side die assemblies and the end die assemblies are moved inward in synchronism with the downward movement of the upper rod die assembly so that the rod portion is pressed from four sides, or both vertically and laterally.

As a method of manufacturing a connecting rod having an excellent buckling strength and fatigue strength, it is known to form low carbon boron steel material into the shape of a connecting rod by hot forging, quench the forged connecting rod, cold forge the quenched connecting rod with a planar forging die assembly so that the ribs are plastically deformed by more than 0.2 mm in the height-wise direction and to be work hardened by being pressed in the vertical direction, and shot peen the cold forged connecting rod so that the fatigue strength may be improved. (Patent Document 3)

PRIOR ART DOCUMENT(S)

Patent Document(s)

Patent Document 1: JP2005-014079A
Patent Document 2: JP5268715B
Patent Document 3: JPH09-196044A

SUMMARY OF THE INVENTION

Task to be Accomplished by the Invention

However, according to the method of manufacturing the connecting rod described in Patent Document 1, in order to increase the strength of the whole rod portion, a compressive load is required to be applied to the entire surface of the rod portion excluding the open lateral sides so that a large forging load is required. Therefore, the forging equipment becomes large in size and the manufacturing cost increases. In the case of the method described in Patent Document 2 also, a large forging load is required to increase the strength of the entire rod portion, and the die structure becomes complicated. Therefore, the manufacturing cost increases.

Further, in the case of the method of manufacturing a connecting rod described in Patent Document 3, because only the tip end portions of each rib are work hardened, and the hardness of the root portion of the rib is limited, a sufficient buckling strength for the rod portion cannot be obtained.

In view of such problems of the prior art, a primary object of the present invention is to provide a connecting rod which can be manufactured without increasing the cost, and is provided with an effectively strengthened rod portion, and a manufacturing method thereof.

Means to Accomplish the Task

In order to achieve such an object, one aspect of the present invention provides a connecting rod (1) having a big end (2), a small end (3), and a rod portion (4) connecting the big end to the small end and having a substantially H-shaped cross section, wherein the rod portion includes a pair of ribs (21) extending in parallel to each other in cross sectional view, and a web (22) connected between substantially vertically middle parts of the ribs, and wherein each rib includes a rib root portion (23) located in a vertically central part thereof in cross sectional view, and a pair of rib tip portions (24) located at both vertical ends thereof, and each rib tip portion has a higher hardness than the web by 40 HV or more, and the rib root portion has a higher hardness than the web by 30 HV or more.

Here, the rib tip portion refers to a portion occupying a quarter of the height of the rib from each tip end at each of the ribs, and the rib root portion refers to a portion which does not include the rib tip portions, and occupies one half of the entire height of the rib in a vertically central part of the rib. Further, the Vickers hardness (HV) of each of the web, the rib tip portions and the rib root portions is measured on a cross sectional surface cut along a plane perpendicular to the axial line of the rod portion, as opposed to the outer surface thereof.

According to this aspect of the present invention, each rib tip portion having the largest contribution to the increase in the buckling strength is made harder than the web by 40 HV or more, and the rib root portion having a secondary contribution to the increase in buckling strength is made harder than the web by 30 HV or more so that the strength of the rod portion is effectively increased. In addition, since it requires only to preferentially increase the hardness of the rib tip portions, the connecting rod can be manufactured without requiring a large forging load or without using a special die assembly.

In this aspect of the present invention, the hardness of the rib tip portions is preferably higher than the hardness of the rib root portion.

According to this aspect of the present invention, the rib tip portions having the largest contribution to the increase in the buckling strength are made harder than the web so that the strength of the rod portion is effectively increased. In addition, since it requires only to preferentially increase the hardness of the rib tip portions, the connecting rod can be manufactured without requiring a large forging load or without using a special die assembly.

In order to achieve the foregoing object, another aspect of the present invention provides a method of manufacturing a connecting rod having a big end, a small end, and a rod portion connecting the big end to the small end and having a substantially H-shaped cross section, wherein the rod portion includes a pair of ribs extending in parallel to each other in cross sectional view, and a web connected between substantially vertically middle parts of the ribs, the method comprising; a first step of hot forging steel material into an intermediate workpiece, and air cooling the intermediate workpiece; and a second step of forging the cooled intermediate workpiece by clamping the same between an upper die assembly and a lower die assembly such that the rib tip portion located at each vertically terminal portion of each rib in cross sectional view has a higher hardness than the web by 40 HV or more, and the rib root portion located at a vertically middle portion of each rib in cross sectional view has a higher hardness than the web by 30 HV or more.

According to this aspect of the present invention, a connecting rod having an effectively strengthened rod portion can be manufactured simply by forging the intermediate workpiece by using only the upper die assembly and the lower die assembly without complicating the die assembly. In addition, since it requires only to preferentially increase the hardness of the rib tip portions, the connecting rod can be manufactured without requiring a large forging load.

In this aspect of the present invention, in the second step, the intermediate workpiece may be cold forged.

According to this embodiment, it is possible to introduce many dislocations into the metallic structure of the rod portion in the second step so that the strength of the rod portion can be increased by dislocation hardening.

Further, in the foregoing aspect of the present invention, the intermediate workpiece may be cold forged by using the upper die assembly and the lower die assembly which are configured so as to reduce a height of each rib, to increase a thickness of each rib, to increase a spacing between the two ribs, and to increase a width of the rod portion.

According to this aspect of the present invention, it is possible to make the rib tip portions and the rib root portions harder than the web by a forging step using a relatively small forging load.

Further, in the foregoing aspect of the present invention, the lower die assembly used in the second step is provided with a pair of side walls projecting upward beyond vertically middle points of the respective ribs so that the vertically middle portions of the ribs are restrained from outside by the side walls of the lower die assembly when the ribs are subjected to a forging load, and the lower die assembly and the upper die assembly used in the second step are configured to create a gap between an inner surface of the lower die assembly and an outer surface of a lower part of each rib, and a gap between an inner surface of the upper die assembly and an outer surface of an upper part of each rib when the ribs are subjected to the forging load.

According to this aspect of the present invention, the forging can be performed as a semi-enclosed upset forging that requires a relatively small forging load and generates substantially no burr. Thereby, the number of the manufacturing steps can be reduced, and relatively small forging equipment can be used so that the manufacturing cost of the connecting rod can be reduced.

Further, in the foregoing aspect of the present invention, the method may further comprise a third step of heating the connecting rod and then annealing the connecting rod by air cooling following the second step.

According to this embodiment, dislocations introduced by forging are fixed so that the rod portion can be work hardened in a stable manner.

Effect of the Invention

As discussed above, the present invention provides a connecting rod which can be manufactured without increasing the cost, and is provided with an effectively strengthened rod portion, and a manufacturing method thereof.

DESCRIPTION OF THE PREFERRED EMBODIMENT(S)

An embodiment of the present invention is described in the following with reference to appended drawings.

Figure 1:
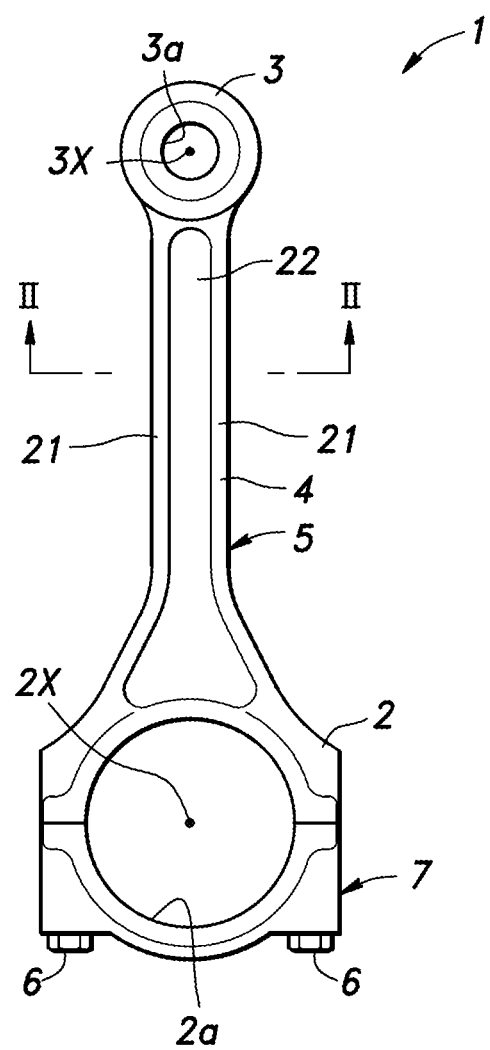
FIG. 1 is a front view of a connecting rod embodying the present invention.

As shown in FIG. 1, the connecting rod 1 includes a big end 2 coupled to a crankshaft (not shown in the drawing), a small end 3 coupled to a piston (not shown in the drawing), and a rod portion 4 connected between the big end 2 and the small end 3. The big end 2 forms an annular bearing surrounding a crank pin of the crankshaft, and defines a crank pin bore 2a having a circular cross section. The small end 3 forms an annular bearing surrounding a piston pin, and defines a piston pin bore 3a having a circular cross section. The big end 2 and the small end 3 are provided with axial lines 2X and 3X, respectively, which are parallel to each other. The connecting rod 1 includes a connecting rod main body 5 formed by the small end 3, the rod portion 4 and a half of the big end 2, and a cap 7 which is fastened to the half of the big end 2 on the side of the connecting rod main body 5 via a pair of threaded bolts 6 as a remaining half of the big end 2.

Figure 2:
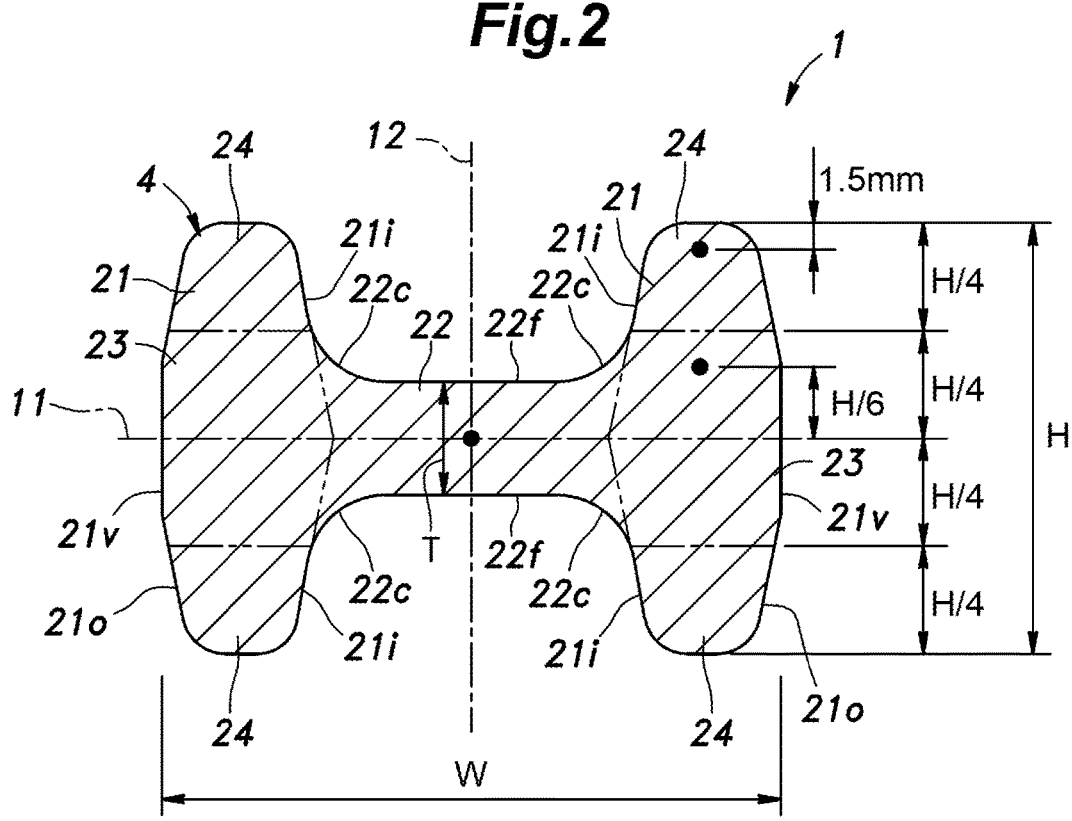
FIG. 2 is a sectional view taken along line II-II of FIG. 1.

FIG. 2 shows a cross section of an intermediate part of the rod portion 4 with respect to the longitudinal direction. As shown in FIG. 2 also, the rod portion 4 consists of a columnar portion extending along a first imaginary plane 11 passing through the center of the big end 2 (the midpoint of the axial line 2X) and the center of the small end 3 (the midpoint of the axial line 3X), and orthogonal to the axial lines 2X and 3X. The rod portion 4 is provided with a prescribed width W as measured along the first imaginary plane 11, and a prescribed thickness H (or the height H of the ribs 21 as will be described hereinafter) as measured along a second imaginary plane 12 defined as a plane containing the axial lines 2X and 3X of the big end 2 and the small end 3, respectively, so as not to buckle under the compressive load of the combustion stroke. The width W of the rod portion 4 is substantially constant in a longitudinally intermediate part of the rod portion 4, and progressively decreases toward the big end 2 and the small end 3 in the vicinity of the big end 2 and the small end 3, respectively. The thickness (H) of the rod portion 4 is substantially equal to the thickness of the big end 2 and the small end 3, and is substantially constant over the entire length in the longitudinal direction of the rod portion 4. In addition, in order to reduce the weight of the connecting rod 1, a laterally intermediate part of the rod portion 4 is reduced in thickness so as to have a substantially H-shaped cross section.

In the following disclosure, the various directions are defined with respect to the paper sheet of FIG. 2. The rod portion 4 is substantially symmetric with respect to the first imaginary plane 11, and with respect to the second imaginary plane 12. The rod portion 4 has a pair of mutually parallel ribs 21 extending parallel to the second imaginary plane 12 along either side end thereof, and a web 22 connected between the vertically central parts of the ribs 21 and extending along the first imaginary plane 11. As a result, the rod portion 4 is provided with a substantially H-shaped cross section.

The thickness of each rib 21 is the greatest in a vertically intermediate part thereof (the thickness being measured along the lateral direction), and progressively decreases toward the upper end and the lower end. Both corners of each tip (each of the upper end and the lower end) of the rib 21 are defined by curved surfaces. The inner surfaces 21i of the ribs 21 are defined by inclined surfaces which incline inward toward the vertically middle part of the rod portion 4. The vertically intermediate parts of the outer surfaces 21o of the ribs 21 are defined by vertical surfaces 21v which are substantially orthogonal to the first imaginary plane 11. The thickness of the ribs 21 is substantially constant over the entire length of the rod portion 4 (see FIG. 1). As mentioned earlier, as the rod portion 4 is provided with a substantially constant thickness, the height H of the ribs 21 is substantially constant over the entire length of the rod portion 4.

The upper surface and the lower surface of the web 22 are defined by mutually parallel flat surfaces 22f in a width-wise intermediate part thereof, and by curved surfaces 22c that are smoothly connected to the inner surfaces 21i of the ribs 21 in width-wise end parts thereof. In other words, the web 22 has a constant thickness T in the width-wise intermediate part thereof, and a progressively greater thickness toward the left and right ribs 21. The web 22 and the ribs 21 are connected to each other via the curved surfaces 22c, and there is no definite boundaries between the web 22 and the ribs 21, but in this disclosure, for the convenience of description, the inclined surfaces defined by extending the inner surfaces 21i of the ribs 21 to the first imaginary plane 11 are referred to as the boundaries between the web 22 and the ribs 21.

Further, a part of each rib 21 located in the vertically intermediate part thereof to which the web 22 is connected is referred to as a rib root portion 23, and parts located in both vertically extreme ends (upper end and lower end) in the vertical direction are referred to as rib tip portions 24. In this disclosure, the rib tip portion 24 at each terminal end of each rib 21 is defined as a portion occupying a quarter of the height H of the rib 21 as measure from the corresponding tip end, and the rib root portion 23 of each rib 21 is defined as a portion occupying the remaining part of the rib 21, or occupying one half of the height H of the rib 21 as measured in the vertically central part of the rib 21.

The rod portion 4 provided with this geometric configuration is given with different hardness values (HV: Vickers hardness) for different parts thereof. More specifically, the hardness of the rib tip portions 24 is higher than the hardness of the web 22 by 40 HV or more. The hardness of the rib root portions 23 is higher than the hardness of the web 22 by 30 HV or more. Further, the hardness of the rib tip portions 24 is higher than the hardness of the rib root portions 23.

The hardness of each of the web 22, the rib tip portions 24 and the rib root portions 23 is measured on a cross sectional surface cut along a plane (the plane shown in FIG. 2) perpendicular to the axial line of the rod portion 4, as opposed to the outer surface thereof. More specifically, the hardness of the web 22 is measured at the center of the web 22 or at the intersection between the first imaginary plane 11 and the second imaginary plane 12 as indicated by the block dot in FIG. 2. The hardness of each rib tip portion 24 is measured at the width-wise center at a distance of 1.5 mm from the tip end surface of the rib tip portion 24. The hardness of each rib root portion 23 is measured at the width-wise center at a distance of sixth of the height H of the rib 21 from the first imaginary plane 11. The hardness is measured according to the Vickers hardness test method prescribed in JIS Z 2244.

The hardness of the rib tip portions 24 and the hardness of the rib root portions 23 is measured at four points in each case, but the four measured values are normally substantially identical to one another. Therefore, only one of such measured values is mentioned as a representative value. The present invention requires that at least one of such numbers satisfies a prescribed condition. For instance, it suffices if the highest of the measured hardness values of the rib tip portions 24 is higher than the hardness of the web 22 by 40 Hv or more, and is higher than the lowest of the four measured hardness values of the rib root portions 23.

It is known that the buckling strength (buckling stress) is proportional to the yield strength (yield stress) of the material as expressed by the Rankine formula or Tetmeyer formula. In addition, the inventors of the present application have confirmed through experiments that the yield stress and the hardness of the material have a substantially proportional relationship. In other words, the buckling strength is substantially proportional to the hardness of the material, and the buckling strength increases as the hardness of the rod portion 4 increases. The inventors of the present application have analyzed the stress distribution of the cross section of a rod portion 4 having the above-described configuration, and discovered that the stress produced in each rib tip portion 24 is about 1.6 times higher than the stress produced in the web 22, and the stress produced in the rib root portion 23 is about 1.3 times higher than the stress produced in the web 22. This means that reinforcing the rib tip portions 24 at which the highest stress is produced is effective in increasing the buckling strength of the rod portion 4.

As discussed above, in the connecting rod 1 of the present embodiment, the hardness of the rib tip portions 24 having the primary contribution to the increase in the buckling strength is higher than the hardness of the web 22 by 40 HV or more, and the hardness of the rib root portions 23 having the secondary contribution to the increase in the buckling strength is higher than the hardness of the web 22 by 30 HV or more so that the strength of the rod portion 4 is effectively increased against buckling. Further, since the hardness of the rib tip portions 24 is higher than the hardness of the rib root portions 23, the strength of the rod portion 4 is effectively enhanced.

A method of manufacturing the connecting rod 1 having such a configuration is described in the following.

Figure 3:
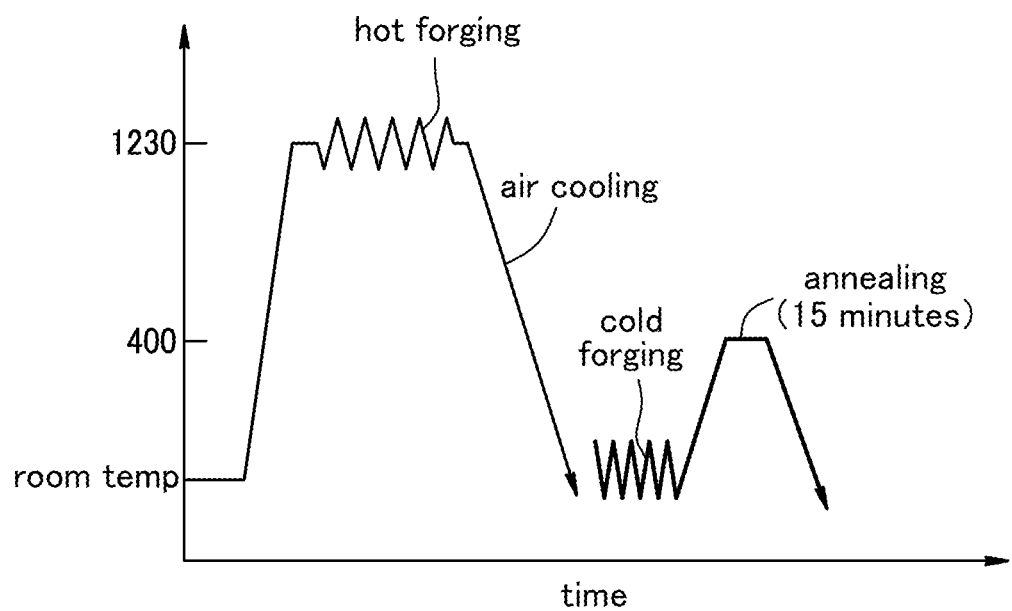
FIG. 3 is a graph illustrating a method of manufacturing the connecting rod shown in FIG. 1.

FIG. 3 is a graph showing the manufacturing conditions of the connecting rod 1 with the abscissa representing time and the ordinate representing temperature. In the present embodiment, the connecting rod 1 was manufactured by using V-containing non-heat treated steel (0.35C-0.7Si-0.7Mn-0.08V) as the material for a connecting rod 1 for mass production. However, the material of the connecting rod 1 is not limited to this, as long as the material consists of metal such as carbon steel which demonstrates work hardening.

In manufacturing the connecting rod 1, firstly the above material is heated to a solution temperature of 1,230° C., and hot forging is carried out to form an intermediate workpiece 51 (preform or intermediate product of the connecting rod 1), and the intermediate workpiece 51 air cooled (natural cooling) to a room temperature. This step is carried out in order to achieve a dislocation reinforcement by creating a ferrite/pearlite mixed structure so that a large number of dislocations may be introduced into the ferrite structure by cold forging which will be described hereinafter.

Thereafter, the intermediate workpiece 51 is cold forged at a room temperature by using a die assembly which will be described hereinafter. Owing to the presence of the ferrite/pearlite structure, the cold forging causes the dislocation density in the pearlite structure to increase in proportion to the amount of the work applied to the product so that work hardening takes place in a favorable manner, and hence, the yield strength of the product is increased.

The cold forged connecting rod 1 given with the above mentioned configuration is heated to the temperature of 400° C. in an atmospheric furnace, and after being held at this temperature for 15 minutes, is annealed by air cooling. Because the dislocations introduced by the cold forging are unstable due to the presence of a large number of mobile dislocations, this step is performed for the purpose of fixing the dislocations introduced by the cold forging. More specifically, by heating, carbon C which forms an interstitial solid solution with steel is diffused into the steel so that the dislocations become fixed. As a result, the work hardening of the rod portion 4 can be made permanent. The annealing temperature is not limited to 400° C., but is preferably 200° C. to 600° C., more preferably 250° C. to 500° C., and most preferably 400° C.

Figure 4A:
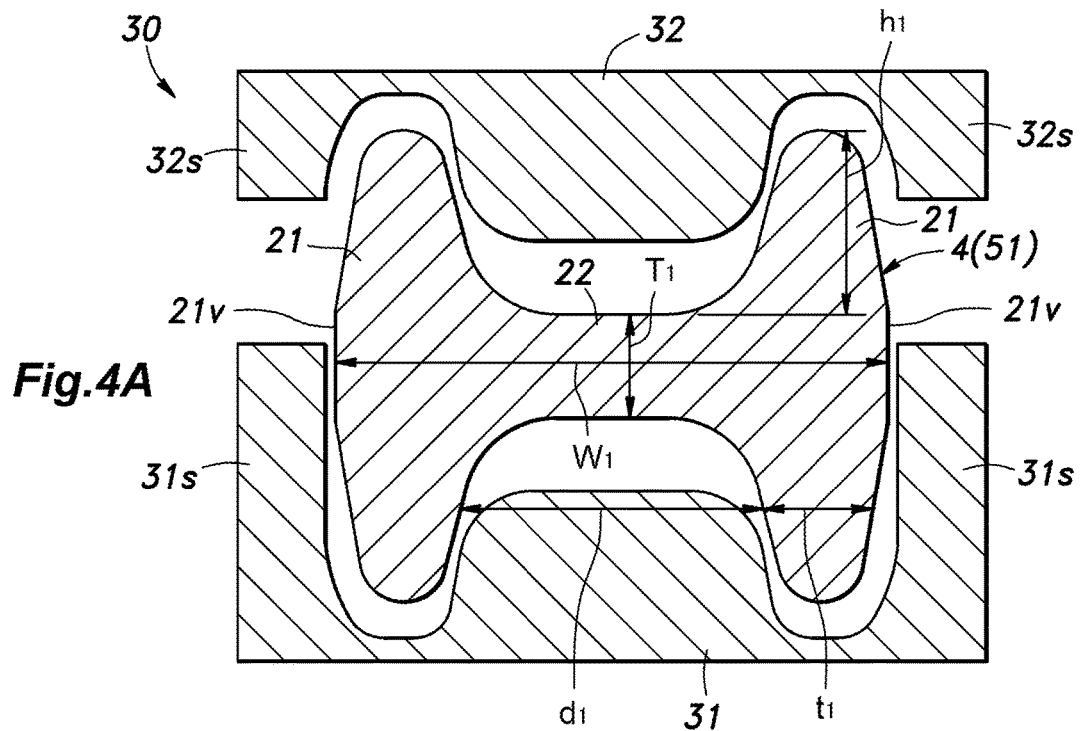
FIG. 4A is a sectional view of the connecting rod before cold forging.
Figure 4B:
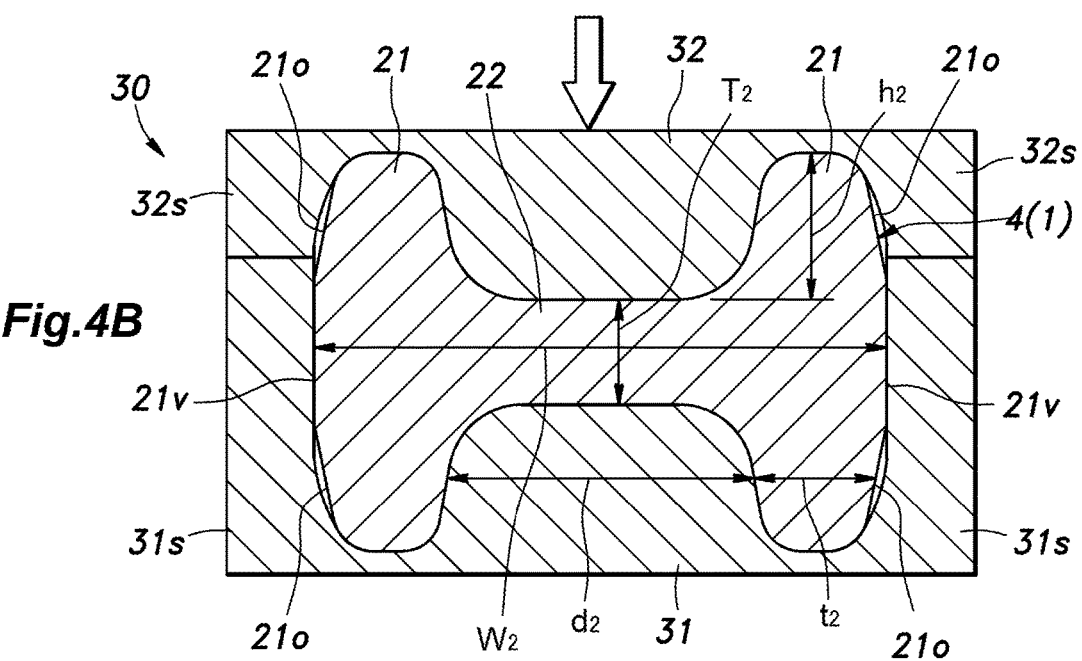
FIG. 4B is a sectional view of the connecting rod after cold forging.

Referring to FIG. 4, the intermediate workpiece 51 of the connecting rod 1 and a metallic die assembly 30 are described in the following. FIG. 4A shows the connecting rod 1 before the forging load is applied (before cold forging), or the intermediate workpiece 51 and the metallic die assembly 30. FIG. 4B shows the connecting rod 1 after the forging load is applied (after cold forging) and the metallic die assembly 30. The intermediate workpiece 51 has a shape close to the connecting rod 1 following the cold forging, and each part is discussed in the following by using common names and reference numerals for the various parts of the connecting rod 1.

As shown in FIG. 4A, the die assembly 30 is composed of a lower die assembly 31 and an upper die assembly 32. The die assembly 30 is configured to cold forge only the rod portion 4 of the intermediate workpiece 51. The big end 2 and the small end 3 are not cold forged because the cold forging of the big end 2 and the small end 3 causes the (machining) workability of these parts in the subsequent working step to be impaired. On the upper surface of the lower die assembly 31 and the lower surface of the upper die assembly 32, recesses corresponding to the shape of the rod portion 4 of the connecting rod 1 after the cold forging are formed. The lower die assembly 31 and the upper die assembly 32 have substantially symmetrical shapes to each other except that side walls opposing the vertical surfaces 21v of the ribs 21 to interpose the rod portion 4 from either side are predominantly formed in the lower die assembly 31.

In other words, the amount of upward protrusion of side walls 31s of the lower die assembly 31 is larger than the amount of downward protrusion of the side walls 32s of the upper die assembly 32. The vertical surfaces 21v and the side wall 31s of the lower die assembly 31 may be slightly inclined in consideration of the ease of removing the cold forged connecting rod 1 from the die assembly 30.

Using this metallic die assembly 30, the intermediate workpiece 51 is set on the lower die assembly 31, and the intermediate workpiece 51 is vertically interposed between the lower die assembly 31 and the upper die assembly 32. The intermediate workpiece 51 is subjected to a prescribed downward load to be plastically deformed into the state shown in FIG. 4B. Upon completion of the cold forging, as shown in FIG. 4B, the upper ends of the side wall 31s of the lower die assembly 31 are positioned above the upper ends of the vertical surfaces 21v of the ribs 21, and the upper ends of the side walls 31s of the lower die assembly 31 and the side walls 32s of the upper die assembly 32 are in contact with each other on either side. The vertical surfaces 21v on the central portions of the outer surfaces 210 of the ribs 21 are in contact with the opposing side walls 31s of the lower die assembly 31, but the remaining part of the rod portion 4 is not in contact with the side walls 31s and 32s of the lower die assembly 31 and the upper die assembly 32. In other words, when the forging load is applied, the central portions (the portions defining the vertical surfaces 21v) of the ribs 21 are constrained from the outside by the lower die assembly 31 so that the plastic deformation of the central portions of the ribs 21 towards either outer side is restricted, but the lower parts and the upper parts of the ribs are allowed to deform plastically without being constrained from the outside.

The lower die assembly 31 and the upper die assembly 32 are configured such that the rib height h2 of the connecting rod 1 after cold forging shown in FIG. 4B is smaller that the rib height h1 of the intermediate workpiece 51 shown in FIG. 4A, the rib thickness t2 of the connecting rod 1 after the cold forging shown in FIG. 4B is larger than the rib thickness t1 of the intermediate workpiece 51 shown in FIG. 4A, the rib spacing d2 of the connecting rod 1 after the cold forging shown in FIG. 4B is larger than the rib spacing d1 of the intermediate workpiece 51, and the width W2 of the rod portion 4 of the connecting rod 1 after the cold forging shown in FIG. 4B is larger than the width W1 of the rod portion 4 of the intermediate workpiece 51 shown in FIG. 4A. In addition, the thickness T2 of the web 22 of the connecting rod 1 after cold forging shown in FIG. 4B is slightly smaller than the thickness T 2 of the web 22 of the intermediate workpiece 51 shown in FIG. 4A, but there may also be substantially no difference. Alternatively, the lower die assembly 31 and the upper die assembly 32 may be configured such that the thickness T2 of the web 22 shown in FIG. 4B is slightly larger than the thickness T1 of the web 22 shown in FIG. 4A.

Figure 5:
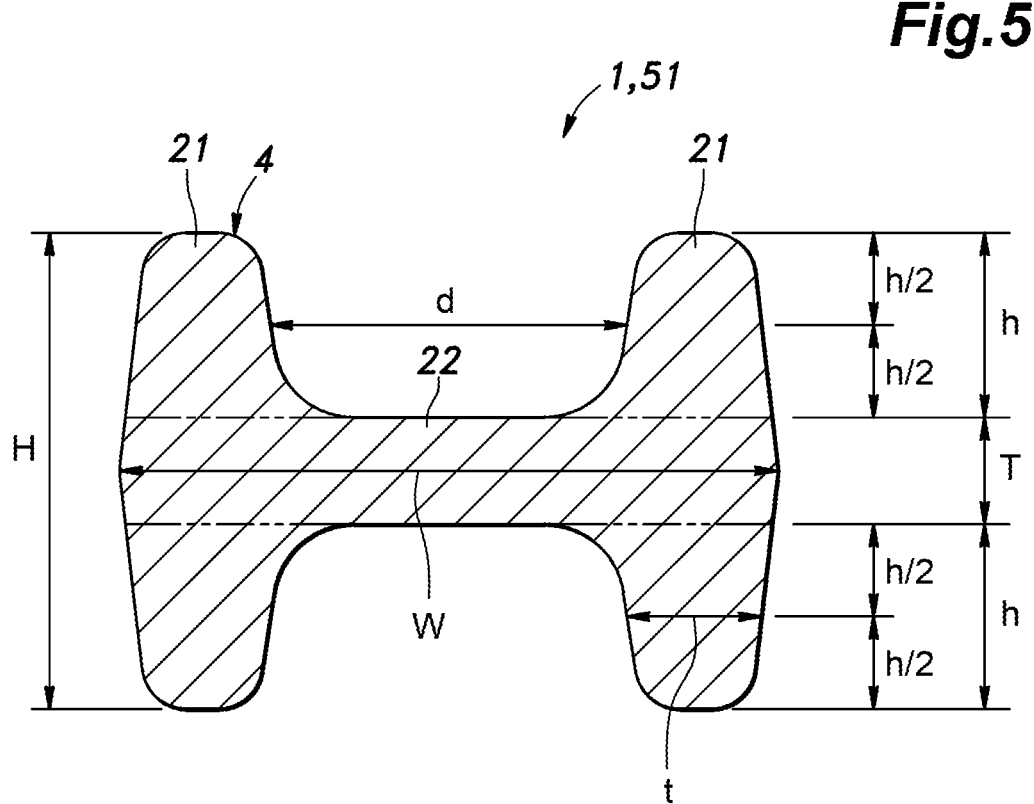
FIG. 5 is a view showing the definition of various dimensions of the rod portion of the connecting rod.

The definition of the various terms used in the foregoing disclosure is discussed in the following with reference to FIG. 5. As the various terms are equally applicable to the intermediate workpiece 51 and the connecting rod 1 after the cold forging, the rod portion 4 of the connecting rod 1 is schematically represented in FIG. 5. The rib height h is the amount of upward and downward protrusion of the ribs 21 from the corresponding surface of the intermediate portion of the web 22 which has a constant thickness (or the height with respect to the extension of the plane 22f in FIG. 2). The rib thickness t is the width-wise dimension of the ribs 21 at ½ of the rib height h. The rib spacing d is the distance between the opposing inner surfaces of the ribs 21 at ½ of the rib height h. The width W of the rod portion 4 is the maximum width of the rod portion 4 (which is the same as the width W shown in FIG. 2). The thickness T of the web 22 is the minimum thickness of the web 22 (which is the same as the thickness T of the constant thickness portion formed in the width-wise middle part of the web 22 as shown in FIG. 2).

By performing the cold forging on the intermediate workpiece 51 by using the metallic die assembly 30 having the above described configuration, the rod portion 4 exhibiting the prescribed hardness distribution or having the rib tip portions 24 preferentially hardened (worked) can be formed by using a relatively small forging load. Further, since the metallic die assembly 30 has a simple configuration including the lower die assembly 31 and the upper die assembly 32, the manufacturing cost of the metallic die assembly can be lowered.

The thickness T2 of the web 22 of the connecting rod 1 after cold forging shown in FIG. 4B is slightly smaller than the thickness T1 of the web 22 of the intermediate workpiece 51 shown in FIG. 4A. This owes to the fact that the web 22 is caused to extend by the forging load which acts upon the slanted inner surfaces 21i of the ribs 21 so as to increase the rib spacing, rather than by the forging load directly acting upon the web 22. The thickness T2 of the web 22 shown in FIG. 4B could also be slightly larger than the thickness T1 of the web 22 shown in FIG. 4A. This owes to the fact that the forging load causes the material of the rod portion 4 to flow toward the web 22 under the forging load. In either case, no compressive forging load is required to be applied to the web 22, thereby reducing the required forging load.

Further, by using the lower die assembly 31 provided with the side walls 31s extending upward beyond the vertically center points of the ribs 21 (as measured after the cold forging step shown in FIG. 4B is performed), when a forging load is applied during the cold forging step, the central parts of the ribs 21 are restrained from the outside by the lower die assembly 31. Also, when the forging load is applied, a gap remains between the outer surfaces 210 of the lower parts of the ribs 21 and the corresponding parts of the inner surface of the lower die assembly 31, and a gap remains between the outer surfaces 210 of the upper parts of the ribs 21 and the corresponding parts of the inner surface of the upper die assembly 32. Therefore, the cold forging step can be carried out without generating burr. Also, the cold forging can be performed as a semi-enclosed upsetting process that requires a relatively small forging load such that the rib tip portions 24 and the rib root portions 23 are sequentially plastically deformed in that order. As a result, the number of manufacturing steps can be reduced, and the forging equipment is prevented from becoming unduly great in size with the result that manufacturing cost of the connecting rod 1 can be reduced.

The advantages of the connecting rod 1 according to the present invention produced as described above are now discussed in the following by comparing some of the embodiments of the present invention with examples of the prior art for comparison.

Table 1 given below shows the hardness of various parts, the differences in hardness between different parts, the forging load, the buckling strength, and the strength ratio for each of the rod portions 4 of Embodiments 1 to 4 and the prior art examples or Examples 1 to 3. In all of Embodiments 1 to 4 and Examples 1 to 3, the intermediate workpieces 51 were hot forged in an identical manner and by using identical material as discussed above in conjunction with the preferred embodiment of the present invention. The connecting rod 1 of Embodiments 1 to 4 were manufactured by using the same metallic die assembly 30 in the way discussed above. The connecting rod 1 of Example 1 was manufactured according to the method disclosed in Patent Document 1, and was cold forged such that the entire rod portion 4 is strengthened. The connecting rod 1 of Example 2 was manufactured according to the method disclosed in Patent Document 3, and was cold forged such that only the rib tip surfaces were subjected to the forging load. The connecting rod 1 of Example 3 was manufactured only by performing the hot forging step, and without performing a cold forging step.

TABLE 1

| | hardness (HV) | | | | | forging | buckling | |
| --- | --- | --- | --- | --- | --- | --- | --- | --- |
| | hot forged 51 | web 22 | rib root 23 | rib tip 24 | diff 1 24 − 22 | diff 2 23 − 22 | load (ton) | strength (MPa) | strength ratio |
| Embodiment 1 | 260 | 280 | 320 | 350 | 70 | 40 | 200 | 900 | 1.38 |
| Embodiment 2 | 260 | 300 | 330 | 360 | 60 | 30 | 240 | 920 | 1.42 |
| Embodiment 3 | 260 | 270 | 300 | 330 | 60 | 30 | 180 | 850 | 1.31 |
| Embodiment 4 | 260 | 260 | 290 | 300 | 40 | 30 | 180 | 800 | 1.23 |
| Example 1 | 260 | 360 | 360 | 360 | 0 | 0 | 650 | 920 | 1.42 |
| Example 2 | 260 | 260 | 280 | 330 | 70 | 20 | 150 | 750 | 1.15 |
| Example 3 | 260 | 260 | 260 | 260 | 0 | 0 | — | 650 | 1.00 |

As shown in Table 1, as no work hardening by cold forging took place in Example 3, there was no difference in hardness between different parts, and the buckling strength was 650 MPa.

On the other hand, in Embodiments 1 to 4, the hardness of the rib tip portions 24 was 40 to 70 HV higher than the hardness of the web 22, and the hardness of the rib root portions 23 was higher than the hardness of the web 22 by 30 to 40 HV. The forging loads of Embodiments 1 to 4 were 180 to 240 t, and the buckling strength was 800 to 900 MPa. The ratio of the buckling strengths of Embodiments 1 to 4 to that of Example 3 were 1.23 to 1.42.

As for Example 2, the forging load was 150 t, which is smaller than those of Embodiments 1 to 4, and the hardness of the rib tip portions 24 was higher than the hardness of the web 22 by 70 HV, but the hardness of the rib root portions 23 was higher than the hardness of the web 22 by only 20 HV. In Example 2, the buckling strength was 750 MPa which is lower than those of Embodiments 1 to 4, and the strength ratio to Example 3 was 1.15. Although not shown in the table, the buckling strength increase ratio per ton of forging load was 0.83 MPa/t (=(800−650)/180) in the case of Embodiment 4, which is the lowest among Embodiments 1 to 4, but was only 0.67 MPa/t (=(750−650)/150) in the case of Example 2 which was lower than that of Embodiments 1 to 4. Thus, the rod portions 4 of Embodiments 1 to 4 were more effectively strengthened than the rod portion 4 of Example 2.

In Example 1, the strength of the entire rod portion 4 was increased, and there was no difference in hardness between different parts thereof. In Example 1, the buckling strength was the highest (920 MPa as was in Example 2) and the strength ratio to Example 3 was 1.42, but a large forging load of 650 t which is far greater than that of Embodiments 1 to 4 was required. However, the buckling strength of Example 1 was similar to that of Example 2 which required the forging load of only 240 t. In other words, in Embodiments 1 to 4, the strength of the rod portion 4 was effectively increased with a small forging load as compared with Example 1.

The present invention has been described in terms of a specific embodiment, but is not limited by this embodiment, and can be substituted and modified without departing from the spirit of the present invention. For example, in the above-described embodiment, as described with reference to FIG. 3, after forming the intermediate workpiece 51 by hot forging, the temperature is lowered to room temperature by air cooling, and cold forging was performed at room temperature. However, it is also possible to perform warm forging after cooling down the temperature to about 400° C. by air cooling. Alternatively, after forming the intermediate workpiece 51 by hot forging, the intermediate workpiece 51 may be cooled to room temperature by air cooling to be heated up to 400° C. to perform warm forging. Besides this, it is possible to appropriately change the specific configuration, arrangement, size, angle, material, manufacturing procedure, temperature, etc. of any part of the connecting rod 1 without departing from the spirit of the present invention. In addition, various elements shown in the above described embodiment are not entirely essential for the present invention, and can be appropriately omitted without departing from the spirit of the present invention.

GLOSSARY OF TERMS

| 1 | connecting rod | 2 | big end |
| 3 | small end | 4 | rod portion |
| 21 | rib | 22 | web |
| 23 | rib root portion | 24 | rib tip portion |
| 30 | die assembly | 31 | lower die assembly |
| 32 | upper die assembly | 32s | side wall |
| 51 | intermediate workpiece | W | width of rod portion 4 |
| d | rib spacing | h | rib height |
| t | rib thickness | | |

The invention claimed is:

1. A method of manufacturing a connecting rod made of metal and having a big end, a small end, and a rod portion connecting the big end to the small end and having a substantially H-shaped cross section, wherein the rod portion includes a pair of ribs extending in parallel to each other in cross sectional view, and a web connected between substantially vertically middle parts of the ribs, the method comprising;

a first step of hot forging steel material into an intermediate workpiece, and air cooling the intermediate workpiece; and a second step of forging the intermediate workpiece by clamping the same between an upper die assembly and a lower die assembly to make a pair of rib tip portions located at both vertical ends of each rib in cross sectional view have a higher hardness than the web by 40 HV or more, and to make a rib root portion located at a vertically middle portion of each rib in cross sectional view have a higher hardness than the web by 30 HV or more.

2. The method of manufacturing a connecting rod according to claim 1, wherein the intermediate workpiece is cold forged in the second step.

3. The method of manufacturing a connecting rod according to claim 2, wherein in the second step, the intermediate workpiece is cold forged by using the upper die assembly and the lower die assembly which are configured such that a height of each rib of the connecting rod after forging is reduced compared to a height of each rib of the intermediate workpiece, a thickness of each rib of the connecting rod after forging is increased compared to a thickness of each rib of the intermediate workpiece, a spacing between the two ribs of the connecting rod after forging is increased compared to a spacing between the two ribs of the intermediate workpiece, and a width of the rod portion of the connecting rod after forging is increased compared to a width of the rod portion of the intermediate workpiece.

4. The method of manufacturing a connecting rod according to claim 3, wherein in the second step, the lower die assembly provided with a pair of side walls projecting upward beyond vertically middle points of the respective ribs after forging is used so that the vertically middle portions of the ribs of the intermediate workpiece are restrained from outside by the lower die assembly when a forging load is applied, and the lower die assembly and the upper die assembly configured to create a gap between an inner surface of the lower die assembly and an outer surface of a lower part of each rib, and a gap between an inner surface of the upper die assembly and an outer surface of an upper part of each rib when the forging load is applied are used to cold forge the intermediate workpiece.

5. The method of manufacturing a connecting rod according to claim 2, further comprising a third step of heating the connecting rod and then annealing the connecting rod by air cooling following the second step.

6. The method of manufacturing a connecting rod according to claim 3, further comprising a third step of heating the connecting rod and then annealing the connecting rod by air cooling following the second step.

7. The method of manufacturing a connecting rod according to claim 4, further comprising a third step of heating the connecting rod and then annealing the connecting rod by air cooling following the second step.

8. The method of manufacturing a connecting rod according to claim 1, further comprising a third step of heating the connecting rod and then annealing the connecting rod by air cooling following the second step.

* * * * *